July 4, 1933.  E. B. HUGHSON  1,917,121
FILTER
Filed Aug. 12, 1931
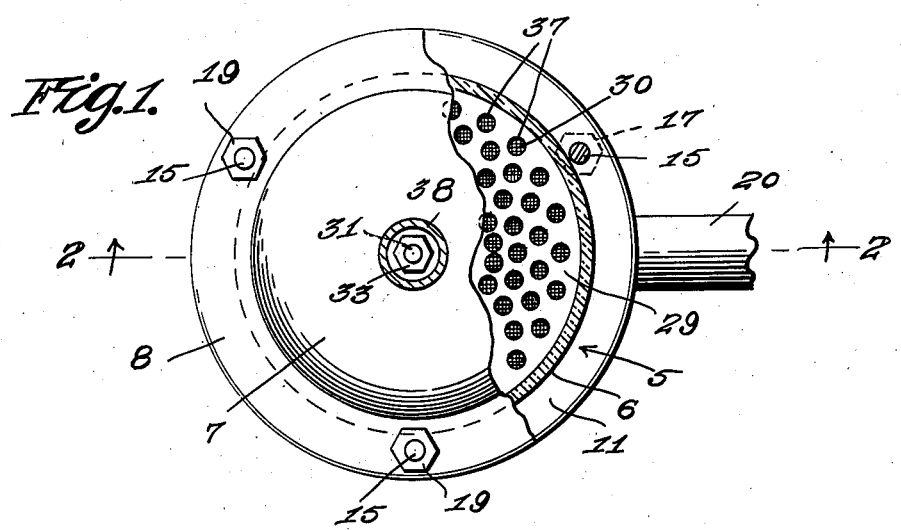
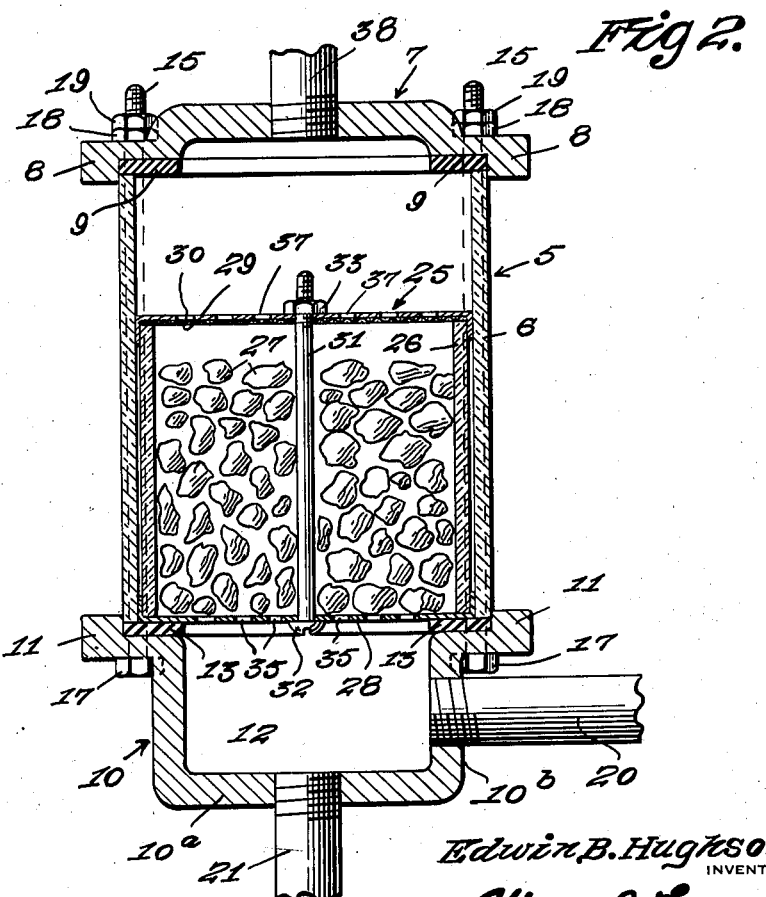
Edwin B. Hughson,
INVENTOR
BY Victor J. Evans
ATTORNEY Patented July 4, 1933

1,917,121

UNITED STATES PATENT OFFICE

EDWIN B. HUGHSON, OF BIG INDIAN, NEW YORK

FILTER

Application filed August 12, 1931. Serial No. 556,692.

This invention relates to filters and it has for one of its objects the provision of a filter operating on a new and useful principle, the filter of my invention providing an increased efficiency. The filter which I have invented, by employing a new principle, is an improvement over filters of the prior art partly in that the whole burden of filtering is not placed on the filtering medium.

Other objects of the invention will be apparent to those skilled in the art upon reading the following specification and putting the filter into use and observing its action.

The invention will be fully and comprehensively understood from a consideration of the following detailed description when read in connection with the accompanying drawing which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawing:

Fig. 1 is a plan view of the filter showing part of the top broken away; and

Fig. 2 is a vertical section taken approximately on the line 2—2 of Fig. 1, looking in the direction of the arrows.

Referring to the drawing for a more detailed description thereof, the numeral 5 indicates an outer casing comprising a hollow cylinder 6 which is preferably made of transparent material such for example as glass. A top or cap 7 having an annular flange 8 and carrying an annular gasket 9 set in its lower face fits the top of the hollow glass cylinder 6. The outer casing 5 further comprises a hollow bottom member 10 provided with an annular flange 11, the recess in the hollow member 10 being designated by the numeral 12. The hollow bottom member 10 carries an annular gasket 13 seated in its upper end, this gasket contacting with the bottom of the glass cylinder 6. The cap or top 7 of the outer casing and the bottom 10 of the same are respectively held tight against the upper and lower ends of the hollow glass cylinder 6 by means of rods 15 passing through the annular flanges 8 and 11 of the cap 7 and the bottom 10, respectively, said rods having at their lower ends heads 17 abutting against the lower face of the flange 11 of the bottom 10 and said rods are provided at their upper ends with nuts 18 threadedly engaging the rods and locked by locking nuts 19. The outer casing 5 has an inlet at its lower end for the entrance of the water or other liquid to be filtered, the water or other liquid entering through a pipe 20 threadedly connected to the bottom 10a of the hollow bottom 10 of the filter, the latter being preferably in a vertical position when connected to water pipes or pipes carrying other liquid.

In the vertical wall 10b of the bottom 10 of the outer casing 5 is threadedly connected a pipe 20 which functions as an inlet pipe for water which is to be filtered and which is then to be carried to the house pipes. In the wall 10a is connected a pipe 21 to be carried to lines where the water is not to be filtered. The pipe 21, in other words, is a branch pipe which may or may not be employed, as conditions require.

An inner casing 25, shorter than the outer casing 5, is disposed within and is movable in, the mentioned outer casing. The inner casing 25 comprises a hollow cylindrical wall 26 which is preferably of transparent material such as glass for example and is adjacent the hollow cylindrical member 6 of the outer casing 5, the member or tube 6, as previously stated, being also preferably transparent, whereby the action of the movable inner casing 25 and the filtering medium 27 contained within the inner casing may be observed. The filtering medium 27 is herein shown as comprising earthy material including pebbles, said filtering material or medium being held within the transparent cylindrical wall or tube 26 by a bottom 28, a top 29 and a filtering screen 30 adjacent to and under the top 29. The bottom 28, the top 29 and the filtering screen 30 are held to the cylindrical wall or tube 26 by means of a bolt 31 passing through them and provided with a head 32 at its lower end and a nut 33 at its upper end.

The bottom 28 is provided with a plurality of apertures 35 so that water or other liquid issuing from the inlet pipe 20 may enter the inner casing 25 and pass through the filtering medium, the top 29 being also provided with a plurality of apertures 37 so that the filtered water may pass from the inner casing to the outer casing and flow through a discharge pipe 38 which may be connected to a faucet.

As previously stated the filter is preferably, but not necessarily, placed in a vertical position as shown in the drawing. The force of the water issuing from the pipe 20 moves, and, when the filter is in a vertical position, floats the inner casing and its contained filtering matter, but, in so doing, has its velocity diminished with the result that at least part of the solid matter to be filtered out of the water or other liquid, is dropped, in accordance with a well known principle of hydraulics, but not heretofore employed in filters as far as I know, it being understood that the inner casing and its contained filtering medium act as an obstruction to the water to reduce its velocity, and when the filter is in a vertical position, act, when floating, as a force opposite in direction to the incoming stream of water so that the velocity of the incoming stream of water is further reduced. The solid material carried by the water and not removed as a result of the diminution and velocity of the water, is removed by the filtering material or medium 27 and by the screen 30.

What is claimed as new is:

1. A filter comprising an outer casing composed of an open-ended cylinder of transparent material, a hollow bottom member on which said cylinder is seated, a cap member seated on the top of said cylinder, gaskets interposed between the cylinder and the bottom member and the cap respectively, bolts extending through peripheral flanges of the bottom member and the cap and disposed exteriorly of the cylinder to secure the elements of the outer casing together, and an inner casing of cylindrical form and of substantially the same diameter as the interior diameter of the outer casing but of less height than the latter, said inner casing being floatingly mounted in the cylindrical portion of the outer casing, and a filtering medium in the inner casing, the inner casing having apertured top and bottom walls, the bottom member being tapped for an intake pipe and the cap member being tapped for an outlet pipe.

2. A filter comprising an outer casing composed of an open-ended cylinder of transparent material, a hollow bottom member on which said cylinder is seated, a cap member seated on the top of said cylinder, gaskets interposed between the cylinder and the bottom member and the cap respectively, bolts extending through peripheral flanges of the bottom member and the cap and disposed exteriorly of the cylinder to secure the elements of the outer casing together, and an inner casing of cylindrical form and of substantially the same diameter as the interior diameter of the outer casing but of less height than the latter, said inner casing being floatingly mounted in the cylindrical portion of the outer casing, and a filtering medium in the inner casing, the inner casing having apertured top and bottom walls, the bottom member being tapped for an intake pipe and the cap member being tapped for an outlet pipe, the hollow bottom member defining an intake chamber below the lowermost plane of descent of the inner casing.

3. A filter comprising an outer casing composed of an open-ended cylinder of transparent material, a hollow bottom member on which said cylinder is seated, a cap member seated on the top of said cylinder, gaskets interposed between the cylinder and the bottom member and the cap respectively, bolts extending through peripheral flanges of the bottom member and the cap and disposed exteriorly of the cylinder to secure the elements of the outer casing together, and an inner casing of cylindrical form and of substantially the same diameter as the interior diameter of the outer casing but of less height than the latter, said inner casing being floatingly mounted in the cylindrical portion of the outer casing, and a filtering medium in the inner casing, the inner casing having apertured top and bottom walls, the bottom member being tapped for an intake pipe and the cap member being tapped for an outlet pipe, the hollow bottom member defining an intake chamber below the lowermost plane of descent of the inner casing, and a filtering screen disposed in the inner casing above the filtering material and adjacent the inner face or top wall thereof.

In testimony whereof I hereby affix my signature.

EDWIN B. HUGHSON.